United States Patent [19]

Watanabe

[11] Patent Number: 4,945,299
[45] Date of Patent: Jul. 31, 1990

[54] CONTROL APPARATUS FOR AN A.C. GENERATOR FOR AUTOMOBILE

[75] Inventor: Hirofumi Watanabe, Himeji, Japan

[73] Assignee: Mitsubishi Denki Kabushiki Kaisha, Tokyo, Japan

[21] Appl. No.: 371,770

[22] Filed: Jun. 27, 1989

[30] Foreign Application Priority Data

Jul. 7, 1988 [JP] Japan .................. 63-169623

[51] Int. Cl.⁵ .............................. H02J 7/14
[52] U.S. Cl. ........................ 322/33; 322/28
[58] Field of Search ............ 322/22, 24, 25, 27, 322/28, 33, 34, 72, 73

[56] References Cited

U.S. PATENT DOCUMENTS

| | | | |
|---|---|---|---|
| 3,599,079 | 8/1971 | Ansbro | 322/28 X |
| 4,220,908 | 9/1980 | Nicol | 322/28 X |
| 4,398,140 | 8/1983 | Morishita | 322/34 X |
| 4,496,898 | 1/1985 | Iwaki et al. | 322/34 |
| 4,563,631 | 1/1986 | Mashino et al. | 322/33 |
| 4,590,415 | 5/1986 | Iwaki et al. | 322/33 X |
| 4,629,967 | 12/1986 | Voss | 322/28 |
| 4,680,530 | 7/1987 | Mashino | 322/28 X |
| 4,760,323 | 7/1988 | Naoi | 322/33 |

FOREIGN PATENT DOCUMENTS 59-15231  5/1984  Japan .
61-08663  3/1986  Japan .

*Primary Examiner*—Mark O. Budd
*Assistant Examiner*—Kristine Peckman
*Attorney, Agent, or Firm*—Sughrue, Mion, Zinn, Macpeak and Seas

[57] ABSTRACT

A reference voltage circuit for a voltage regulator control includes three parallel voltage dividers cross-coupled by oppositely poled diodes, one of the dividers having a negative voltage-temperature characteristic tied to the battery electrolyte temperature and another divider having a positive characteristic. With this arrangement the reference voltage remains constant below a first electrolyte temperature t1, decreases between t1 and a second, higher temperature t2, and decreases at a reduced rate above t2.

2 Claims, 2 Drawing Sheets

CONTROL APPARATUS FOR AN A.C. GENERATOR FOR AUTOMOBILE

BACKGROUND OF THE INVENTION

The present invention relates to a voltage control apparatus for an a.c. generator for an automobile capable of providing the optimum characteristic of battery-charged voltage vs. temperature in a possible range of voltage and capable of changing a temperature characteristic in a flexible manner.

A conventional voltage control apparatus for an a.c. generator comprises a reference voltage circuit having a resistance type voltage dividing circuit and a constant voltage circuit wherein the collector of a transistor is connected to the resistance type voltage dividing circuit and the constant voltage circuit applies a constant bias voltage to the collector of the transistor as described in, for instance, Japanese Examined patent publication No. 8663/1986. Namely, by utilizing the forward voltage characteristic of the base emitter of the transistor, the transistor can be controlled to be in a cut-off condition, a saturated condition or a transient condition which is between the cut-off condition and the saturated condition depending on the temperature of the electrolyte in a battery. Further, in the reference voltage circuit connected with the collector of the transistor, the reference voltage is changed, whereby the characteristic as shown by line (a) in FIG. 2 can be obtained.

In the conventional voltage control apparatus having the above-mentioned construction, a proportional relation between the temperature of the battery and a control voltage is not established because the current amplifying function of the transistor is further activated under a high temperature condition, whereby it is difficult to bring an ideal battery-charged voltage characteristic close to the characteristic as shown by line (c) in FIG. 2.

Further, while it is necessary to fix a charged voltage to be constant in a low temperature region from the viewpoint of the life time of a lamp or the like, it is not preferable to fix the charged voltage at an engine room in which temperature is gradually elevated because the life time of the battery is shortened due to excessive charging. Thus, in the conventional control apparatus, there has been no way to satisfy both requirements.

SUMMARY OF THE INVENTION

It is an object of the present invention to provide a voltage control apparatus for an a.c. generator for an automobile capable of realizing an ideal battery-charged voltage characteristic; capable of providing charged voltage characteristics in various regions of low and high temperature regions in a flexible manner; and capable of eliminating a deviation between the ideal characteristic and the actual characteristic due to dispersion of the structural elements. In accordance with the present invention, there is provided a voltage control apparatus for an a.c. generator for an automobile which comprises an a.c. generator having an armature winding and a field winding, a rectifier to rectify the output of the a.c. generator to charge a battery, a voltage detection circuit to detect the voltage of the battery, a constant voltage circuit to generate a constant voltage on the basis of the voltage of the battery through the operations of a key switch, a reference voltage circuit comprising at least two sets of a resistance type voltage dividing circuit and/or a resistance type voltage dividing circuit including a diode which divides the constant voltage of the constant voltage circuit, and a diode connected between each voltage dividing point of the at least two sets of the resistance type voltage dividing circuit so that a voltage reduction rate of a divided voltage is changed depending on a low temperature region lower than a first predetermined temperature, a high temperature region higher than a predetermined second temperature and a middle temperature region between the points of the predetermined first and second temperature, and a voltage control circuit which compares the voltage of the voltage detection circuit with the voltage of the reference voltage circuit and controls a field current to the field winding depending on a difference in the comparison to hereby make the voltage of the battery constant.

BRIEF DESCRIPTION OF THE DRAWINGS

In drawings.

DETAILED DESCRIPTION OF THE PREFERRED EMBODIMENT

In the following, an embodiment of the voltage control apparatus for an a.c. generator for an automobile according to the present invention will be described.

Figure 1:
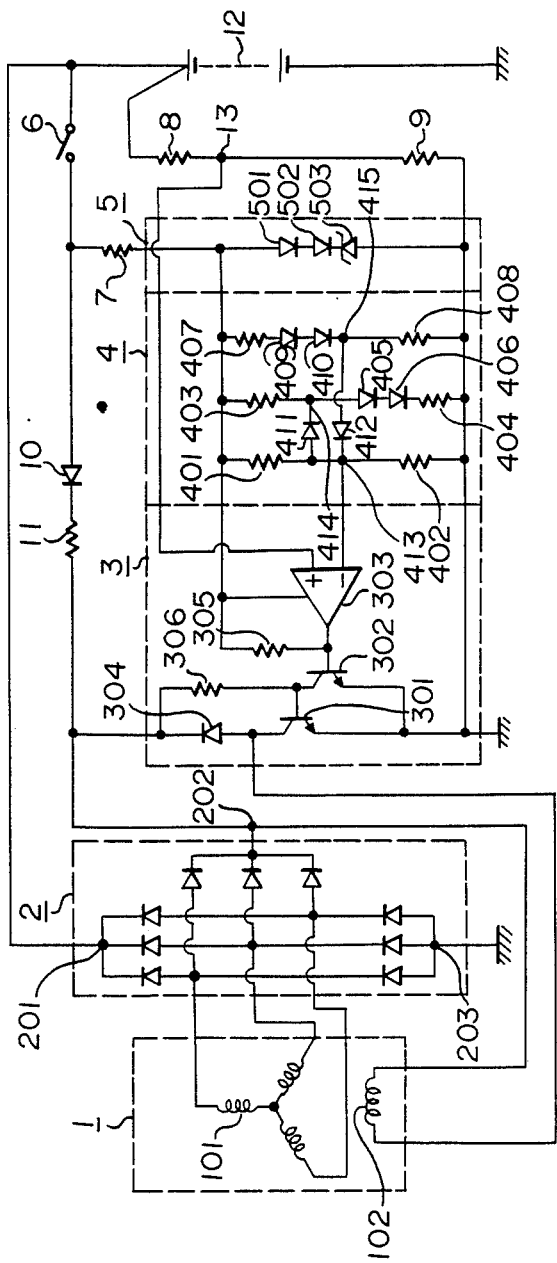
FIG. 1 is a circuit diagram of an embodiment of the voltage control apparatus for an a.c. generator for an automobile.

In FIG. 1, a reference numeral 1 designates an a.c. generator driven by an engine (not shown) which comprises an armature winding 101 and a field winding 102. A rectifier 2 having a main output terminal 201, an auxiliary output terminal 202 and an earth terminal 203 performs full-wave rectification of the output of the a.c. generator 1.

A reference numeral 3 designates a voltage control circuit having a Darlington connection comprising an output transistor 301 to turn on or off a field current to the field winding 102, a control transistor 302 supplied with a current rectified by the rectifier 2 through a resistor 306 to thereby control a current to the base of the output transistor 301, a resistor 305 to supply a current to the base of the control transistor 302, a comparator 303 to turn on or off a current to the base of the control transistor 302, and a diode 304 connected between the collector of the output transistor 301 and the field winding 102 to absorb a surge produced in the field winding 102.

A constant voltage circuit 5 is constituted by diodes 501, 502 and a constant voltage diode 503 wherein the anode of the diode 501 is connected to the positive terminal of a battery 12 through a power source pull-up resistor 7 and a key switch 6, and the anode of the constant voltage diode 503 is grounded.

Voltage dividing resistors 8, 9 are connected in series to constitute a resistance type voltage dividing circuit which is connected in parallel to the battery 12. A voltage dividing point 13 between the voltage dividing resistors 8, 9 is connected to the positive input terminal of the comparator 303.

A reference voltage circuit 4 has a serial connection of voltage dividing resistors 401, 402 for constituting a resistance type voltage dividing circuit which divides a constant voltage produced by the constant voltage circuit 5 and applies a voltage at the voltage dividing point 413 to a negative input terminal of the comparator 303. Accordingly, the comparator 303 compares the voltage at the voltage dividing point 413 in the reference voltage circuit 4 with the voltage dividing point 13 of the constant voltage circuit 5.

The reference voltage circuit 4 has a first resistance-diode type voltage dividing circuit constituted by a serial connection of a voltage dividing resistor 403, diodes 405, 406 and a voltage dividing resistor 404, which divides the constant voltage produced by the constant voltage circuit 5. The connecting point between the voltage dividing resistor 403 and the diode 405 is used as a voltage dividing point 414.

Similarly, the reference voltage circuit has a second resistance-diode voltage dividing circuit constituting by a serial connection of a voltage dividing resistor 407, voltage dividing diodes 409, 410 and a voltage dividing resistor 408, which divides the constant voltage produced by the constant voltage circuit 5. The connecting point between the voltage dividing diode 410 and the voltage dividing resistor 408 is used as a voltage dividing point 415.

First and second diodes 411, 412 are respectively connected between the voltage dividing points 413 and 414 and between the voltage dividing points 413 and 415 so as to have the polarities opposite to each other.

The reference voltage circuit is adapted to directly or indirectly detect the temperature of the electrolyte in the battery. Namely, the voltage dividing point 414 has a negative voltage temperature characteristic and is so determined as to be equal to the difference between the potential at the voltage dividing point 413 and a forward voltage drop in the diode 411 at a predetermined temperature $t_1$ (about 50° C.).

On the other hand, the voltage dividing point 415 has a positive voltage-temperature characteristic and is so determined as to be equal to the sum of the potential at voltage dividing point 413 and a forward voltage drop in the diode 412 at a predetermined electrolyte temperature $t_2$ (about 90° C.). One end of a serial connection of the key switch 6, a diode 10 and a resistor 11 is respectively connected to the positive terminal of the battery 12 and the main output terminal 201 of the rectifier 2, and the other end of the serial connection circuit is connected to the field winding 102 and the auxiliary output terminal 202. A connecting point between the diode 10 and the key switch 6 is connected to one end of the resistor 7.

The operation of the voltage control apparatus of the present invention will be described.

When the key switch 6 is closed, the output transistor 301 is turned on and an exciting current is passed in the field winding 102 through the diode 10 and the resistor 11; thus initial excitation takes place. Then, the engine is actuated and the voltage of the d.c. generator 1 rises, whereby the battery 12 is gradually charged by the output of the rectifier 2 through the main output terminal 201.

On the other hand, in the voltage control circuit 3, the voltage of the battery 12 is divided by the voltage dividing resistors 8, 9.

The comparator 303 compares the voltage at the voltage dividing point 13 with the voltage at the voltage dividing point 413 of the reference voltage circuit 4. In response to the comparator output the transistor 302 is turned on or off, which attendantly turns since the output transistor 301 off or on depending on the magnitude of the voltages at the dividing points 13 and 413, whereby the exciting current to the a.c. generator is controlled to thereby control the voltage of the battery 12 to be constant.

Generally, a battery shows different charging voltage characteristics depending on the temperature of electrolyte in the battery due to the speed of the chemical reaction and the capacity of charging. It is desirable that the battery has a voltage-temperature characteristic as indicated by a line (c) in FIG. 2 so as to prolong the performance of the battery. However, in batteries used for automobiles, there is an allowable range of voltage to various loads, and the charged voltage has to be lower than a limit indicated by a line (c) in FIG. 2. Further, excessive charging and insufficient charging should be avoided in a high temperature range more than $t_2$ in the engine room because the temperature in the engine room is apt to increase. It is, therefore, desirable that an ideal voltage-temperature characteristic should be between the lines (c) and (e) and should approach the line (c) in FIG. 2 as closely as possible.

Figure 2:
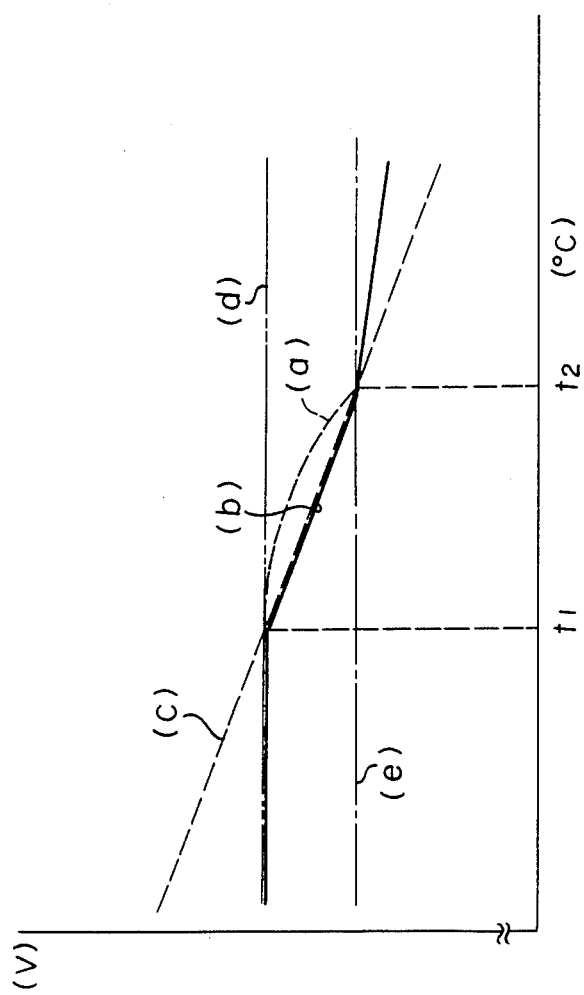
FIG. 2 is a characteristic diagram showing a relation between a temperature of electrolyte in battery and a charged voltage.

The present invention is to provide a voltage-temperature characteristic as indicated by a line (b) in FIG. 2 in order to satisfy the above-mentioned requirements. The construction to realize this voltage-temperature characteristic will be described with reference to FIG. 1.

As described before, the reference voltage circuit is constituted by utilizing the forward voltage characteristics of the diodes 405, 406, 409 and 410 in such a manner that when the temperature of the electrolyte in the battery increases, the potential of the voltage dividing point 414 is decreased and the potential of the voltage dividing point 415 is increased while the potential of the voltage dividing point 413 is unchanged.

When the temperature of the electrolyte in the battery is lower than $t_1$, the voltage difference between the voltage dividing points 413 and 414 and the voltage difference between the voltage dividing points 415 and 413 are respectively lower than the forward drop voltage of the diode 411 and the diode 412, hence currents do not flow at each of the voltage dividing points. However, when the temperature reaches $t_1$, the voltage difference between the voltage dividing points 413 and 414 becomes equal to the forward drop voltage of the diode 411. Namely, when the temperature becomes higher than $t_1$, a current flows from the voltage dividing point 413 to the voltage dividing point 414 so that the potential at the voltage dividing point 413 shows a negative characteristic to temperature.

Further, the construction of the reference voltage circuit is so made that when the temperature reaches $t_2$, the voltage difference between the voltage dividing points 415 and 413 becomes equal to the forward drop voltage of the diode 412. Namely, when the temperature is higher than $t_2$, a current flows from the voltage dividing point 413 to the voltage dividing point 414, and at the same time, the current flows from the voltage dividing point 415 to the voltage dividing point 413. Accordingly, voltage drop at the voltage dividing point 413 is reduced, whereby a voltage reducing rate at the voltage dividing point 413 can be changed by balancing a current flowing rate at the voltage dividing point 413 and other voltage dividing points; thus, the voltage characteristic as indicated by the line (b) in FIG. 2 is obtainable.

In the above-mentioned embodiment, the nature of the diodes 405, 406, 409 and 410 is such that the forward drop voltage of the diodes changes at a rate of −2mV/°C. when the temperature change of the electrolyte in the battery is utilized in order to impart the positive or negative voltage-temperature characteristics to the voltage dividing point 414 or 415. Accordingly, the number of the diodes 405, 406, 409 and 410 to be used is not limited to that as in the above-mentioned embodiment.

Thus, in accordance with the present invention, the reference voltage circuit has voltage dividing circuits having three voltage-temperature characteristics (a negative, a positive and a flat characteristics) by utilizing the forward drop voltage characteristic of the diodes, and the voltage dividing points having the negative and positive characteristics are respectively connected to the voltage dividing point having the flat characteristic through the diodes respectively. Accordingly, three kinds of temperature gradient can be independently obtained to realize an ideal charged voltage characteristic for a battery in a voltage range restricted by various electric loads in an automobile.

Further, the charged voltage characteristic can be changed depending on a change of voltage in a flexible manner. Further, a factor of fluctuation caused by a change of temperature can be reduced by replacing transistors by diodes. Accordingly, a highly accurate circuit for compensating temperature stepwisely can be obtained.

I claim:

1. A voltage control apparatus for an a.c. generator for an automobile, which comprises:
   an a.c. generator having an armature winding (101) and a field winding (102),
   a rectifier (2) for rectifying the output of the a.c. generator to charge a battery (12) containing an electrolyte,
   a voltage detection circuit (8,9) for detecting the voltage of the battery,
   a constant voltage circuit (5) for generating a constant voltage on the basis of the voltage of the battery through the operation of a key switch (6),
   a reference voltage circuit (4) comprising:
   (i) a first voltage divider including two resistors (401,402) connected in series and defining a first junction point (413) therebetween,
   (ii) a second voltage divider including a resistor (403) and a diode (405,406) connected in series and defining a second junction point (414) therebetween,
   (iii) a third voltage divider including a diode (409,410) and a resistor (408) connected in series and defining a third junction point (415) therebetween,
   (iv) the second junction point having a negative voltage-temperature characteristic with respect to the electrolyte temperature, the third junction point having a positive voltage-temperature characteristic with respect to the electrolyte temperature, and the first, second and third voltage dividers being connected between said constant voltage circuit and ground,
   (v) a first coupling diode (411) connected to the second junction point for supplying a potential thereof to the first junction point, and
   (vi) a second coupling diode (412) connected to the third junction point for supplying a potential thereof to the first junction point and having a polarity opposite that of the first coupling diode, and
   a voltage control circuit (3) for comparing the voltage of the voltage detection circuit with the voltage of the first junction point of the reference voltage circuit and controlling a field current to the field winding depending on a difference in the comparison to render the voltage of the battery constant, wherein:
   (a) the voltage at the first junction point remains constant below a first predetermined electrolyte temperature (t1).
   (b) the voltage at the first junction point decreases with an electrolyte temperature increase at a first reduction rate between said first temperature and a second, higher predetermined electrolyte temperature (t2), and
   (c) the voltage at the first junction point decreases with an electrolyte temperature increase at a second lower reduction rate above said second temperature.

2. The voltage control apparatus according to claim 1, wherein the voltage control circuit is provided with a comparator (303) which has a positive terminal connected to the voltage detection circuit and a negative terminal connected to the first junction point.

* * * * *